United States Patent
Harris et al.

(10) Patent No.: US 6,433,894 B1
(45) Date of Patent: Aug. 13, 2002

(54) DATA TRANSFER WITHIN A COMMUNICATION SYSTEM

(75) Inventors: Robert James Harris, Fort Worth; Eric Steven Goldsmith, Weatherford, both of TX (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/167,594

(22) Filed: Oct. 7, 1998

(51) Int. Cl.$^7$ .................................. H04N 1/00
(52) U.S. Cl. ..................... 358/434; 358/437; 358/407; 375/363
(58) Field of Search ................. 358/405, 434, 358/431, 426, 407, 437; 379/100.01; 370/470, 476, 528; 375/363

(56) References Cited

U.S. PATENT DOCUMENTS

| | | | | |
|---|---|---|---|---|
| 4,131,915 A | * | 12/1978 | Nakagome et al. | 358/260 |
| 4,301,479 A | * | 11/1981 | Fukinuki et al. | 358/257 |
| 4,386,373 A | * | 5/1983 | Kondo et al. | 358/260 |
| 4,672,460 A | * | 6/1987 | Tsuda | 358/257 |
| 5,208,682 A | * | 5/1993 | Ahmed | 358/434 |
| 5,691,820 A | * | 11/1997 | Komatsu | 358/434 |
| 6,005,675 A | * | 12/1999 | Maeda et al. | 358/442 |
| 6,195,348 B1 | * | 2/2001 | Burkitt | 370/356 |

OTHER PUBLICATIONS

Telecommunications Industry Association/Electronics Industry Association / Interim Standard 707–A.7.*
TR45 "Data Service for Wideband Spread Spectrum Systems: Analog Fax Service" TIA/EIA/IS–707–A.7 (PN–4145.7) V&V Version Jul., 1998.

* cited by examiner

*Primary Examiner*—Edward Coles
*Assistant Examiner*—Tia A. Carter
(74) *Attorney, Agent, or Firm*—Kenneth A. Haas; Steven A. May (57) ABSTRACT

The remote unit (113) maintains a count of inserted blank scan lines generated by the remote unit (113) and uses this to maintain a fixed number of scan lines per page during facsimile transmission. More particularly, in the preferred embodiment of the present invention the remote unit (113) maintains a fixed number of lines per page by deleting scan lines comprising a predetermined set of characters from the actual facsimile transmitted, until the number of scan lines deleted from the facsimile is equal to the number of blank scan lines generated by the remote unit (113).

13 Claims, 5 Drawing Sheets

DATA TRANSFER WITHIN A COMMUNICATION SYSTEM

FIELD OF THE INVENTION

The present invention relates generally to wireless communication systems and, in particular, to data transfer over such wireless communication systems.

BACKGROUND OF THE INVENTION

Due to the nature of transmitting facsimile data within a communication system, often times it is necessary to insert blank lines at the top of a page in order to keep the receiving facsimile machine from disconnecting. More particularly, situations (such as the necessity to retransmit data due to high bit error rates (BERs), delays caused by the facsimile protocol, and delays caused by demodulation, transmission, and remodulation of signals) can cause unacceptable delays when transmitting a facsimile, causing a page start timer to expire. Prior-art procedures addressing this situation have prevented the receiving facsimile machine from disconnecting by periodically sending the receiving facsimile machine a series of blank scan lines when the subscriber equipment detects an unacceptable delay in reception. The result is that the receiving facsimile machine recognizes the blank lines as part of the facsimile transmission, and remains connected. Such a prior-art procedure of facsimile transmission is described in Telecommunications Industry Association/Electronics Industry Association/Interim Standard 707-A.7 (EIA/TIA/IS-707-A.7) sections 5.1.2 and 6.2.2. In accordance with EIA/TIA/IS-707-A.7, the insertion of each blank line requires the removal of scan lines from the actual facsimile to maintain a fixed number of lines per page. As a result, actual image scan lines (i.e., non-blank lines) may be discarded from the page to maintain a fixed number of lines per page. Therefore, a need exists for a method and apparatus for data transfer within a communication system that allows for a receiving facsimile machine to remain connected during long periods of delay, while preserving the actual image scan lines transmitted.

DETAILED DESCRIPTION OF THE DRAWINGS

To address the need for data transmission within a communication system a method and apparatus for data transmission is provided in which a remote unit maintains a count of inserted blank scan lines generated by the remote unit and uses this to maintain a fixed number of scan lines per page. In the preferred embodiment of the present invention the remote unit maintains a fixed number of lines per page by deleting scan lines comprising a predetermined set of characters or a highly correlated scan line) from the actual facsimile transmitted, until the number of scan lines deleted from the facsimile is equal to the number of blank scan lines generated by the remote unit. Thus, non-blank and uncorrelated lines are prevented from being discarded from a facsimile page when the number of blank or correlated lines within the page is equal to, or greater than the number of blank scan lines generated by the remote unit. As a result the actual image scan lines within the facsimile are preserved.

The present invention encompasses a method for data transfer within a communication system. The method comprises the steps of determining that a peripheral device is waiting for a first set of data, and will terminate a connection if data is not received by the peripheral device within a period of time. The peripheral device is sent a second set of data in response to the determination, and the first set of data is analyzed. In the preferred embodiment of the present invention a subset of the first set of data is not sent to the peripheral device when the subset of the first set of data contains a predetermined set of characters, otherwise the subset of the first set of data is transmitted to the peripheral device.

The present invention additionally encompasses a method for data transfer within a communication system. In the preferred embodiment of the present invention the communication system comprises a facsimile machine that is programmed to disconnect when facsimile data is not transferred to the facsimile machine within a predetermined time period. The method comprises the steps of determining that facsimile data has not been transferred to the facsimile machine within a second predetermined time period and sending the facsimile machine first data in response to the determination. Next, facsimile data ready to be transmitted to the facsimile machine is analyzed and is not sent to the facsimile machine when the facsimile data comprises a predetermined set of characters, otherwise the facsimile data is transmitted to the facsimile machine.

Finally, the present invention encompasses an apparatus for data transfer within a communication system. In the preferred embodiment of the present invention the communication system comprises a facsimile machine that is programmed to disconnect when facsimile data is not transferred to the facsimile machine within a predetermined time period. The apparatus comprises a microprocessor having facsimile data as an input and fails to output the facsimile data when the facsimile data comprises a predetermined set of characters, otherwise the microprocessor outputs the facsimile data.

Figure 1:
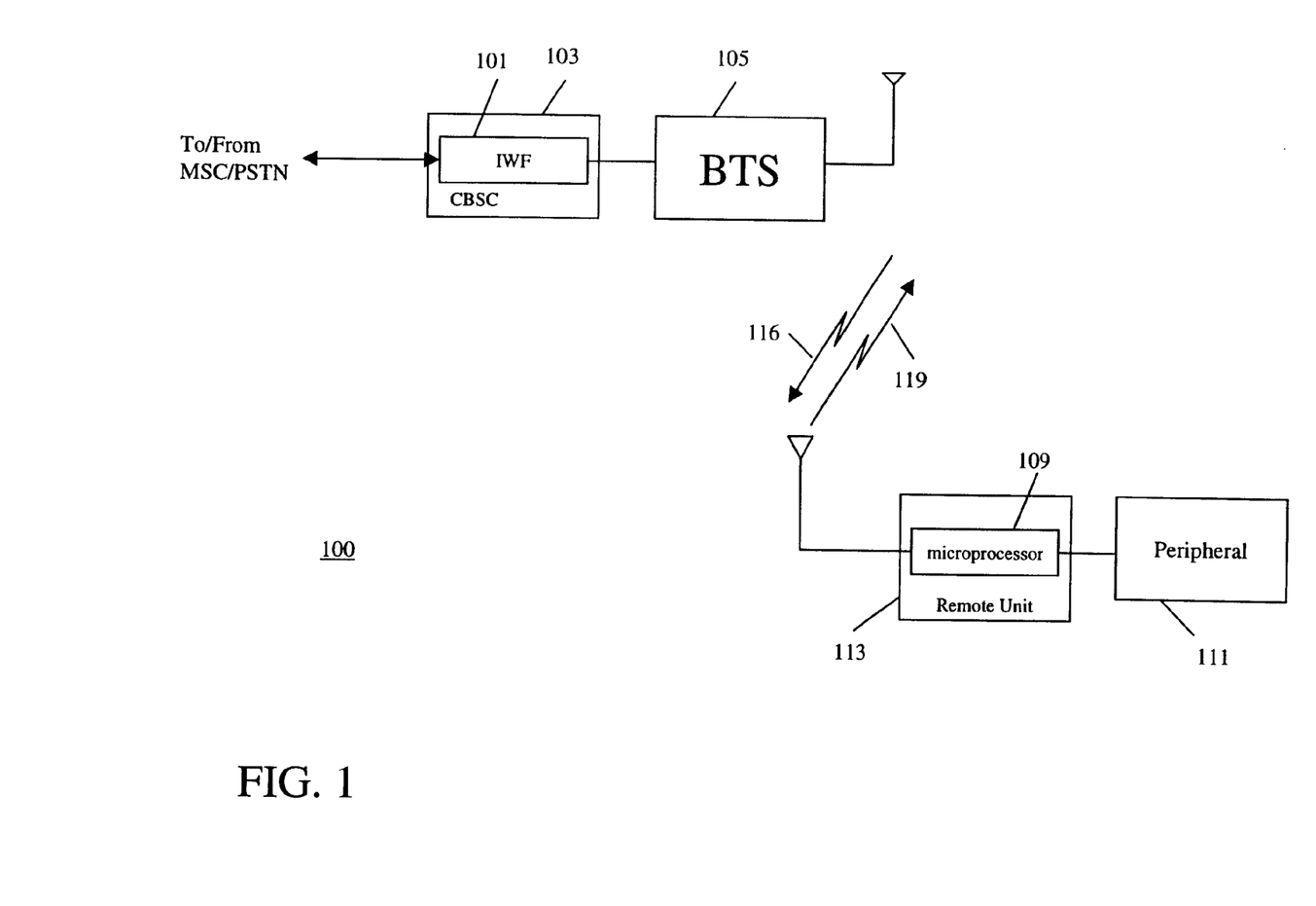
FIG. 1 is a block diagram of a communication system in accordance with the preferred embodiment of the present invention.

Turning now to the drawings, wherein like numerals designate like components, FIG. 1 is a block diagram of communication system 100 in accordance with the preferred embodiment of the present invention. In the preferred embodiment of the present invention, communication system 100 utilizes a Code Division Multiple Access (CDMA) system protocol as described in "Personal Station-Base Station Compatibility Requirements for 1.8 to 2.0 GHz Code Division Multiple Access (CDMA) Personal Communication Systems" (American National Standards Institute (ANSI) J-STD-008), but in alternate embodiments communication system 100 may utilize other analog or digital cellular communication system protocols such as, but not limited to, the Narrowband Advanced Mobile Phone Service (NAMPS) protocol, the Advanced Mobile Phone Service (AMPS) protocol, the Global System for Mobile Communications (GSM) protocol, the Personal Digital Cellular (PDC) protocol, or the United States Digital Cellular (USDC) protocol. Communication system 100 includes base station 105, remote unit 113, Centralized Base Station Controller (CBSC) 103, and peripheral 111.

In the preferred embodiment of the present invention base station 105 is preferably a Motorola SC9600 base station and CBSC 103 is preferably comprised of a Motorola SG1128BF CBSC component. Remote unit 113 is preferably a fixed wireless terminal such as a Motorola, Inc. ST1001A fixed wireless terminal having internal microprocessor 109, which in the preferred embodiment is a Motorola 68000 family microprocessor. Additionally, peripheral 111 is a facsimile machine coupled to remote unit 113 via a standard 2-wire analog telephone circuit (typically a Registered-Jack type 11 (RJ-11)). Peripheral 111 utilizes the facsimile protocol described in CCITT Blue Book Recommendations T.0 through T.63 Volume VII fascicle 7.3 "Terminal Equipment and Protocols for Telematic Services," which is incorporated by reference herein. (CCITT Recommendations can be obtained through the International Telecommunication Union which can be reached at International Telecommunication Union (ITU) Sales and Marketing Service, Place des Nations, CH-1211 Geneva 20, Switzerland).

As shown, remote unit 113 is communicating with base station 105 via uplink communication signal 119 and base station 105 is communicating with remote unit 113 via downlink communication signal 116.

Operation of communication system 100 in accordance with the preferred embodiment of the present invention occurs as follows: During facsimile transmission from base station 105 to remote unit 113, downlink communication signal 116 may become corrupted, inter alai, due to a high frame error rate (FER), or high BER. Once corrupted, the particular frame transmitted may again be retransmitted at the request of remote unit 113. As discussed above, the retransmission of data to remote unit 113, demodulation/ remodulation, and retraining of the high speed carrier can cause an unacceptable delay when transmitting a facsimile, causing a page start timer within peripheral 111 to expire. In accordance with TIA/EIA/IS-707-A.7, remote unit 113 generates and sends a blank scan line to peripheral 111 every 1 second (maximum), until facsimile data is received by remote unit 113. Remote unit 113 maintains a count of inserted blank scan lines generated by remote unit 113 and uses this to maintain a fixed number of scan lines per page. More particularly, in the preferred embodiment of the present invention remote unit 113 maintains a fixed number of lines per page by deleting blank scan lines from the actual facsimile transmitted, until the number of blank scan lines deleted from the facsimile is equal to the number of blank scan lines generated by remote unit 113.

Figure 2:
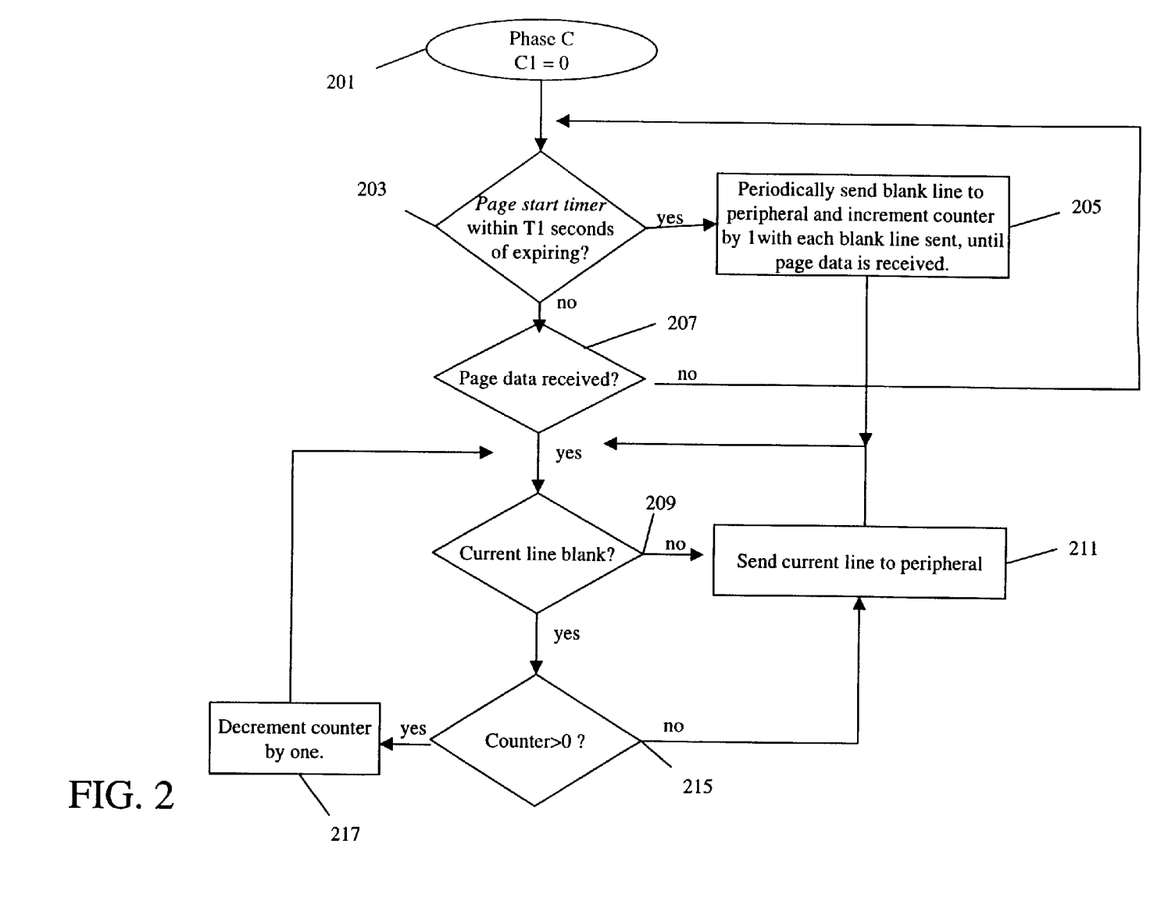
FIG. 2 is a flow chart showing operation of the remote unit of FIG. 1 in accordance with the preferred embodiment of the present invention.

FIG. 2 is a flow chart showing operation of remote unit 113 of FIG. 1 in accordance with the preferred embodiment of the present invention during phase C of a T.30 facsimile transmission. The logic flow begins at step 201 where remote unit 113 is actively engaged in a T.30 facsimile reception, and has entered phase C of the facsimile session. Additionally, at step 201 a counter (C1) is set to zero. At step 203 microprocessor 109 determines if page start timer is within 3 (T1) seconds of expiring. More particularly, microprocessor 109 determines if peripheral 111 is waiting for facsimile data, and peripheral 111 will terminate a connection if the data is not received by peripheral 111 within T1. If at step 203, page start timer is within 3 seconds of expiring, then the logic flow continues to step 205 where a blank scan line generated by remote unit 113 is periodically (every second) sent to peripheral 111 and C1 is incremented by one with each blank scan line sent. The process of periodically sending blank scan lines and incrementing C1 continues until page data is received. Once page data is received the logic flow continues to step 209.

If at step 203 it is determined that page start timer is not within 3 seconds of expiring, then the logic flow continues to step 207 where it is determined if facsimile data has been received from base station 105, and if not the logic flow returns to step 203. If at step 207 it is determined that image line has been received from base station 105, the logic flow continues to step 209 where the current line is analyzed to determine if the current line received comprises a predetermined set of characters. In the preferred embodiment of the present invention the current line is analyzed to determine if it comprises a blank line. If the current line received at step 209 is not a blank line, then the logic flow continues to step 211 where the current line is sent to peripheral 111, otherwise the logic flow continues to step 215.

At step 215 it is determined if C1>0. More particularly, at step 215 it is determined if any blank scan lines have been generated by remote unit 113 and transmitted to peripheral 111, and if not, the current blank line is transmitted to peripheral 111. If at step 215 it is determined that blank scan lines generated by remote unit 113 have been transmitted to peripheral 111 (i.e., C1>0) then C1 is decremented by one (step 217) and the logic flow returns to step 209 without the blank line being sent to peripheral 111. In other words, microprocessor 109 fails to transmit the single line of the facsimile data to peripheral 111.

The preferred embodiment of the present invention prevents non-blank lines from being discarded from a facsimile page when the number of blank lines within the page is equal to, or greater than the number of blank scan lines generated by remote unit 113. As a result the actual image scan lines within the facsimile are preserved.

Figure 3:
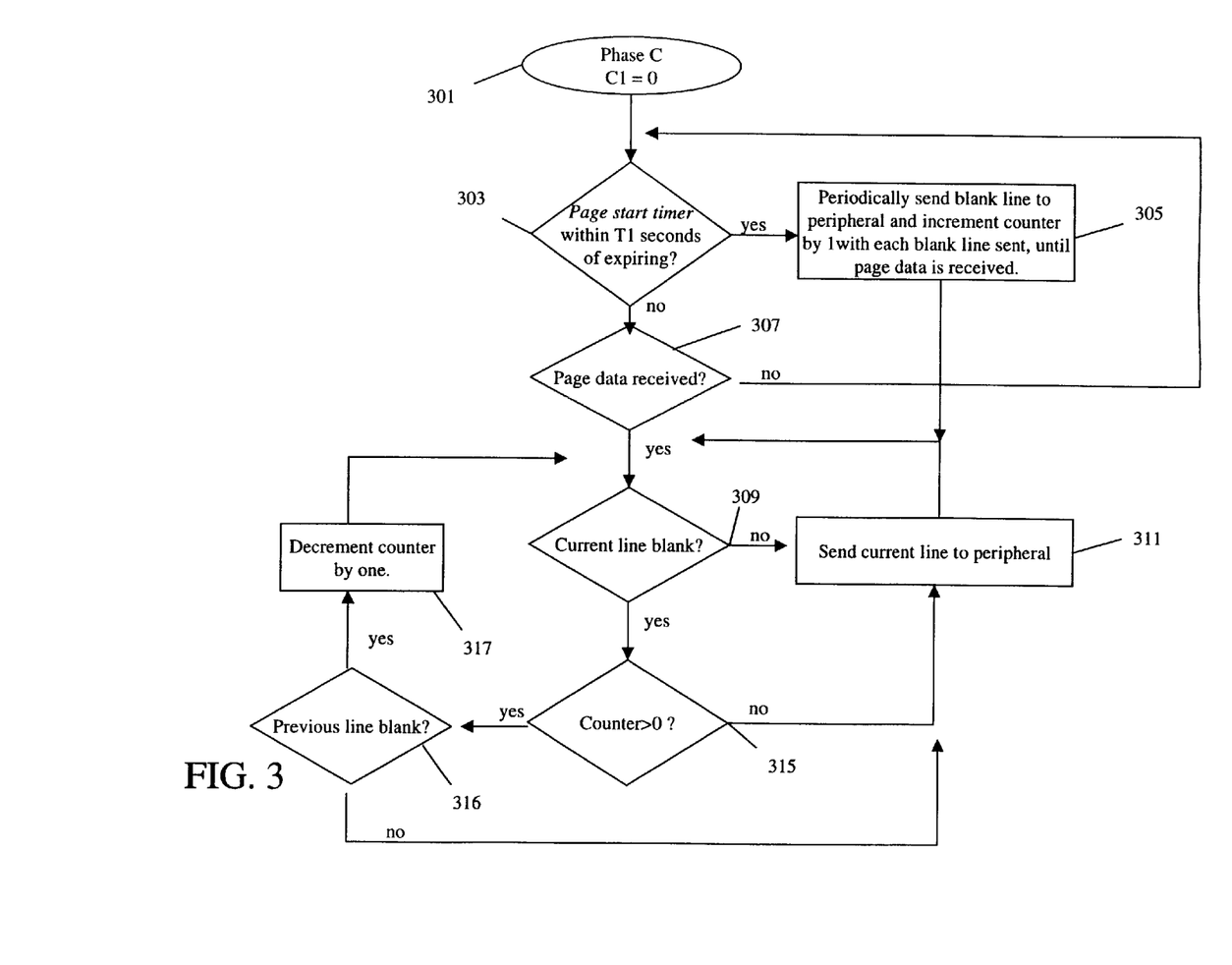
FIG. 3 is a flow chart showing operation of the remote unit of FIG. 1 in accordance with an alternate embodiment of the present invention.

FIG. 3 is a flow chart showing operation of communication system 100 in accordance with an alternate embodiment of the present invention. In the alternate embodiment of the present invention only blank scan lines existing adjacent to other blank scan lines are removed from the actual facsimile. The logic flow begins at step 301 where remote unit 113 is actively engaged in a facsimile reception, and has entered phase C of the T.30 facsimile session. Additionally, at step 301 a counter (C1) is set to zero. At step 303 microprocessor 109 determines if page start timer is within 3 (T1) seconds of expiring. If at step 303, page start timer is within 3 seconds of expiring, then the logic flow continues to step 305 where a blank scan line generated by remote unit 113 is periodically (every second) sent to peripheral 111 and C1 is incremented by one with each blank scan line sent. The process of periodically sending blank scan lines and incrementing C1 continues until page data is received. Once page data is received the logic flow continues to step 309.

If at step 303 it is determined that page start timer is not within 3 seconds of expiring, then the logic flow continues to step 307 where it is determined if facsimile data has been received from base station 105, and if not the logic flow returns to step 303. If at step 307 it is determined that facsimile data has been received from base station 105, the logic flow continues to step 309 where it is determined if the current line received is a blank line. If the current line received at step 309 is not a blank line, then the logic flow continues to step 311 where the current line is sent to peripheral 111, otherwise the logic flow continues to step 315.

At step 315 it is determined if C1>0. More particularly, at step 315 it is determined if any blank scan lines generated by remote unit 113 have been 35 transmitted to peripheral 111, and if not, the current blank line is transmitted to peripheral 111. If at step 315 it is determined that blank scan lines generated by remote unit 113 have been transmitted to peripheral 111 (i.e., C1>0) then the logic flow continues to step 316 where microprocessor 109 determines if the previous line transmitted (i.e., line transmitted immediately prior to the current line) to peripheral 111 was blank. If, at step 316 it is determined that the previous line transmitted to peripheral 111 was blank, then C1 is decremented by one (step 317) and the logic flow returns to step 309 without the blank line being sent to peripheral 111. However, if at step 316 it is determined that the previous line transmitted to peripheral 111 was not blank, the logic flow continues to step 311 where the current line is sent to peripheral 111.

Figure 4:
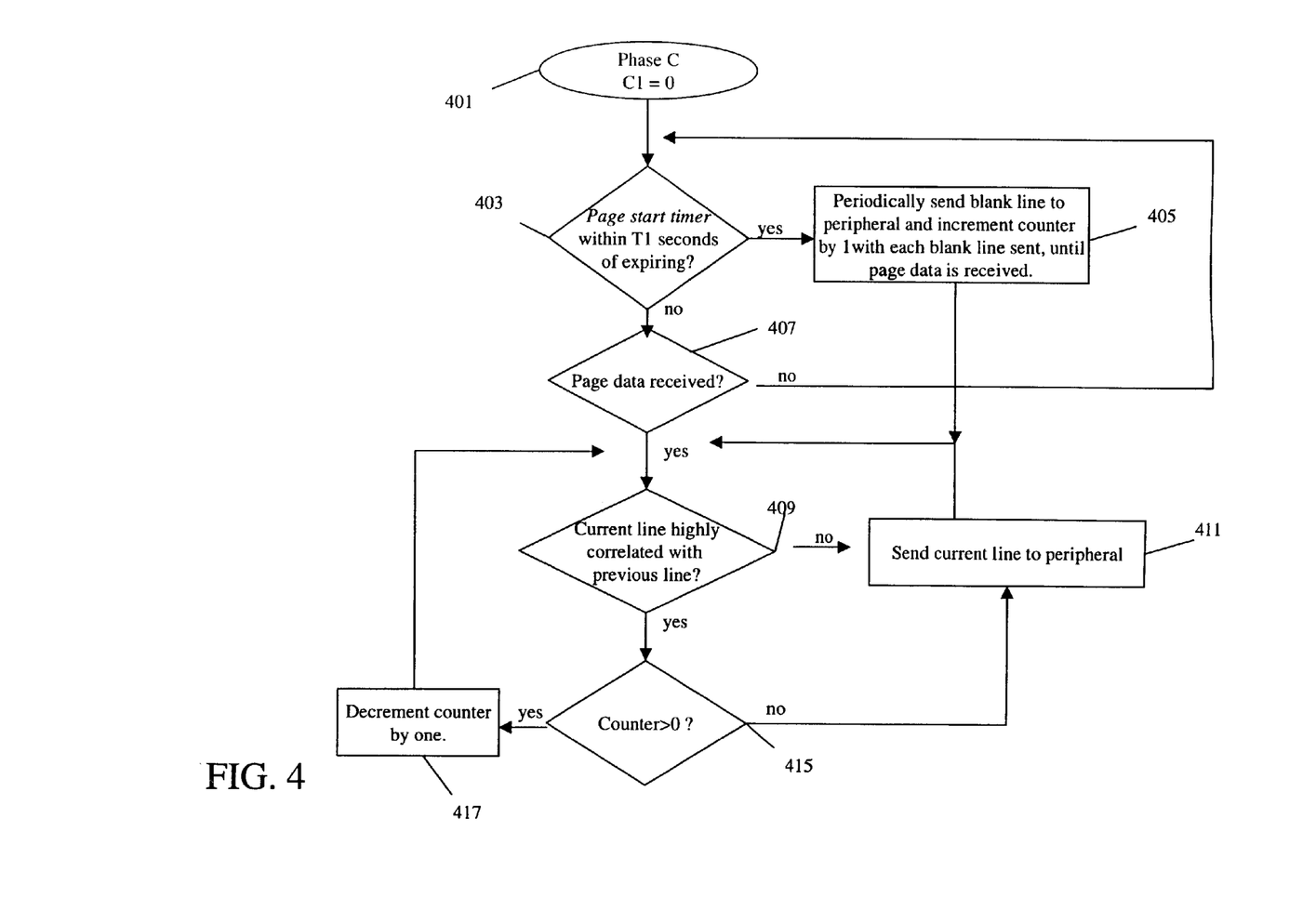
FIG. 4 is a flow chart showing operation of the remote unit of FIG. 1 in accordance with a second alternate embodiment of the present invention.

FIG. 4 is a flow chart showing operation of the remote unit of FIG. 1 in accordance with a second alternate embodiment of the present invention. In the second alternate embodiment of the present invention a line that is highly correlated with a previously transmitted line is eliminated from the facsimile when a blank scan line generated by remote unit 113 has been transmitted to peripheral 111. More particularly, there exists situations where virtually no line transmitted to peripheral 111 will be blank. In these situations it is beneficial to remove one line from two adjacent, highly correlated lines instead of removing other lines from the page.

The logic flow begins at step 401 where remote unit 113 is actively engaged in a T.30 facsimile reception, and has entered phase C of the facsimile session. Additionally, at step 401 a counter (C1) is set to zero. At step 403 microprocessor 109 determines if page start timer is within 3 (T1) seconds of expiring. If at step 403, page start timer is within 3 seconds of expiring, then the logic flow continues to step 405 where a blank scan line generated by remote unit 113 is periodically (every second) sent to peripheral 111 and C1 is incremented by one with each blank scan line sent. The process of periodically sending blank scan lines and incrementing C1 continues until page data is received. Once page data is received the logic flow continues to step 409.

If at step 403 it is determined that page start timer is not within 3 seconds of expiring, then the logic flow continues to step 407 where it is determined if facsimile data has been received from base station 105, and if not the logic flow returns to step 403. If at step 407 it is determined that facsimile data has been received from base station 105, the logic flow continues to step 409 where it is determined if the current line received is highly correlated to the line transmitted immediately prior to the current line being transmitted. In the preferred embodiment of the present invention, this is accomplished by determining how many image pels are different between the current line and the previous line. If the number of different pels divided by the total number of pels in the current line is less than 5%, then the current line is correlated to the previous line.

Continuing, if the current line received at step 409 is not highly correlated to the line transmitted immediately prior to the current line, then the logic flow continues to step 411 where the current line is sent to peripheral 111, otherwise the logic flow continues to step 415.

At step 415 it is determined if C1>0. More particularly, at step 415 it is determined if any blank scan lines generated by remote unit 113 have been transmitted to peripheral 111, and if not, the current line is transmitted to peripheral 111. If at step 415 it is determined that blank scan lines generated by remote unit 113 have been transmitted to peripheral 111 (i.e., C1>0) then C1 is decremented by one (step 417) and the logic flow returns to step 409 without the current line being sent to peripheral 111.

Figure 5:
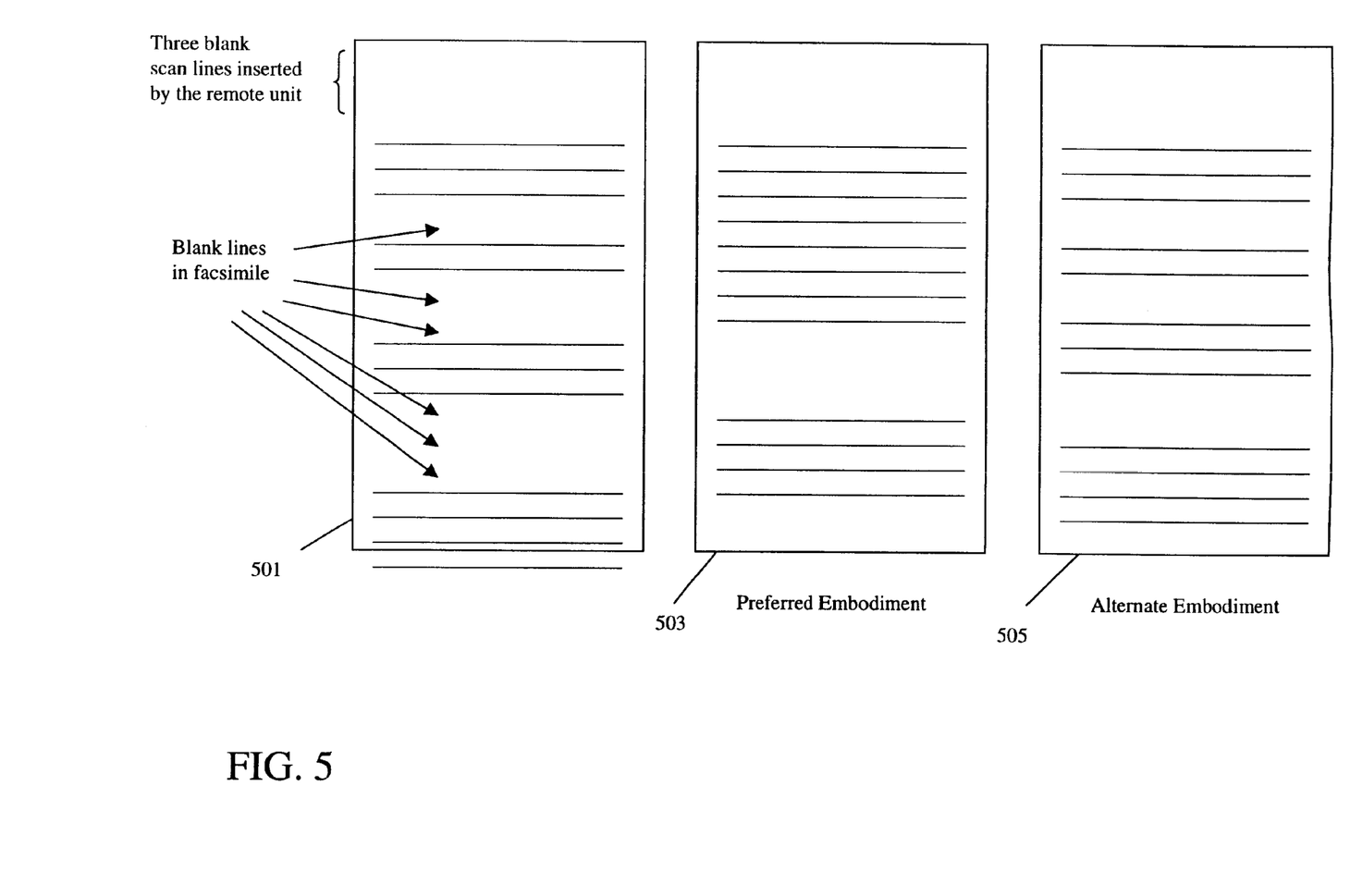
FIG. 5 illustrates a facsimile page having undergone transmission via the preferred and the alternate embodiment of the present invention.

FIG. 5 illustrates a facsimile page having undergone transmission via the preferred and the alternate embodiment of the present invention. In this illustration three blank scan lines were inserted at the beginning of the particular page shown by remote unit 113. If no lines are deleted from the facsimile transmission the resulting output from the facsimile machine would be as shown in page 501. As can be seen in page 501, at least one line has been transmitted outside the printable page area Page 503 shows deletion of blank lines from the facsimile in accordance with the preferred embodiment of the present invention. As shown, the first three blank lines have been deleted from the image, resulting in all scan lines being within the printable page area. Finally, page 505 shows deletion of blank lines from the facsimile in accordance with the alternate embodiment of the present invention. As shown, only those blank lines with a blank line immediately preceding the scan line have been eliminated from the facsimile image.

The descriptions of the invention, the specific details, and the drawings mentioned above, are not meant to limit the scope of the present invention. For example, although the present invention was described being performed by microprocessor 109 within remote unit 113 (performing the tasks required by section 5.1.2 of TIA/EIA/IS-707-A.7), one of ordinary skill in the art will recognize that the present invention can be performed by Interworking Function (IWF) 101 within CBSC 103 in order to perform the tasks required by section 6.2.2 of TIA/EIA/IS-707-A.7. Additionally, although the preferred and alternate embodiments were described separately, the individual embodiments may be combined into a single embodiment without varying from the scope of the present invention. For example, blank scan lines may be eliminated from the actual facsimile transmission until no more blank lines remain to be eliminated. At this point, highly-correlated scan lines can then be eliminated. It is the intent of the inventors that various modifications can be made to the present invention without varying from the spirit and scope of the invention, and it is intended that all such modifications come within the scope of the following claims and their equivalents.

What is claimed is:

1. A method for data transfer within a communication system, the method comprising the steps of:
    determining that a peripheral device is waiting for a first set of data, and will terminate a connection if data is not received by the peripheral device within a period of time;
    sending the peripheral device a second set of data in response to the determination;
    receiving the first set of data;
    analyzing the first set of data for blank scan lines; and
    failing to transmit a subset of the first set of data to the peripheral device when the subset of the first set of data comprises a blank scan line, otherwise transmitting the subset of the first set of data to the peripheral device.

2. The method of claim 1 wherein the step of determining that the peripheral device is waiting for the first set of data comprises the step of determining that a facsimile machine is waiting for the first set of data.

3. The method of claim 1 wherein the step of sending the peripheral device the second set of data comprises the step of sending the peripheral device a blank line when the first set of data has not been transferred to the peripheral device within a second time period.

4. The method of claim 1 wherein the step of failing to transmit the subset of the first set of data to the peripheral device comprises the step of failing to transmit the subset of the first set of data to the peripheral device when the subset of the first set of data comprises a blank scan line and a previous scan line comprises a blank can line.

5. The method of claim 1 wherein the step of failing to transmit the subset of the first set of data to the peripheral device comprises the step of failing to transmit the subset of the first set of data to the peripheral device when the subset of the first set of data comprises a scan line that is highly correlated to a previous scan line.

6. A method for data transfer within a communication system, the communication system comprising a facsimile machine that is programmed to disconnect when facsimile data is not transferred to the facsimile machine a predetermined time period, the method comprising the steps of:

determining that facsimile data has not been transferred to the facsimile machine within a second predetermined time period;

sending the facsimile machine first data in response to the determination;

analyzing facsimile data that is ready to be transmitted to the facsimile machine; and failing to transmit the facsimile data to the facsimile machine when the facsimile data comprises a blank scan line, otherwise transmitting the facsimile data to the facsimile machine.

7. The method of claim 6 wherein the step of sending the facsimile machine first data in response to the determination comprises the step of sending the facsimile machine a blank line when the facsimile data has not been transferred to the facsimile machine within the second predetermined time period.

8. The method of claim 6 wherein the step of analyzing facsimile data transmitted to the facsimile machine comprises the step of determining the content of a scan line.

9. The method of claim 6 wherein the step of failing to transmit the facsimile data comprises the step of failing to transmit the facsimile data to the facsimile machine when the facsimile data comprises a blank scan line and a previous scan line comprises a blank scan line.

10. The method of claim 6 wherein the step of failing to transmit the facsimile data comprises the step of failing to transmit the facsimile data to the facsimile machine when the facsimile data comprises a scan line that is highly correlated to a previous scan line.

11. An apparatus for data transfer within a communication system, the communication system comprising a facsimile machine that is programmed to disconnect when facsimile data is not transferred to the facsimile machine within a predetermined time period, the apparatus comprising a microprocessor having facsimile data as an input and failing to output the facsimile data when the facsimile data comprising a blank scan line, otherwise outputting the facsimile data.

12. The apparatus of claim 11 wherein the microprocessor fails to output the facsimile data when the facsimile data comprises a blank scan line and the previous scan line comprises a blank scan line.

13. The apparatus of claim 11 wherein the microprocessor fails to output the facsimile data when the facsimile data comprises a scan line that is highly correlated to a previous scan line.

* * * * *

UNITED STATES PATENT AND TRADEMARK OFFICE
CERTIFICATE OF CORRECTION

PATENT NO.    : 6,433,894 B1
DATED         : August 13, 2002
INVENTOR(S)   : Harris et al.

It is certified that error appears in the above-identified patent and that said Letters Patent is hereby corrected as shown below:

<u>Column 7,</u>
Line 6, reads "blank can line", should be -- blank scan line --.
Line 16, insert -- within -- after "machine" and before "a".

Signed and Sealed this

Eleventh Day of March, 2003

JAMES E. ROGAN
*Director of the United States Patent and Trademark Office*